United States Patent
Moro et al.

(10) Patent No.: US 11,248,549 B2
(45) Date of Patent: Feb. 15, 2022

(54) START AND STOP CONTROL FOR A VEHICLE

(71) Applicant: Honda Motor Co., Ltd., Tokyo (JP)

(72) Inventors: Kosuke Moro, Saitama (JP); Kohei Hanada, Saitama (JP); Hiroaki Ninomiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/853,725

(22) Filed: Apr. 20, 2020

(65) Prior Publication Data

US 2020/0332732 A1 Oct. 22, 2020

(30) Foreign Application Priority Data

Apr. 22, 2019 (JP) .............................. JP2019-080803

(51) Int. Cl.
*F02D 41/04* (2006.01)
*F02D 41/24* (2006.01)
*F02D 41/06* (2006.01)

(52) U.S. Cl.
CPC ......... *F02D 41/042* (2013.01); *F02D 41/065* (2013.01); *F02D 41/2451* (2013.01)

(58) Field of Classification Search
CPC .. F02D 41/042; F02D 41/2451; F02D 41/065; F02N 2300/2011; F02N 2200/102; F02N 2200/0801; F02N 11/0822
See application file for complete search history.

(56) References Cited

U.S. PATENT DOCUMENTS

| | | | |
|---|---|---|---|
| 9,261,065 B2* | 2/2016 | Christen | F02N 11/0822 |
| 10,012,201 B1* | 7/2018 | Chen | F02N 11/0818 |
| 10,385,815 B1* | 8/2019 | Dudar | B60W 10/06 |
| 2003/0004635 A1* | 1/2003 | Kamiya | B60W 10/06 |
| | | | 701/112 |
| 2012/0123666 A1* | 5/2012 | Stoffels | F01M 1/02 |
| | | | 701/113 |

(Continued)

FOREIGN PATENT DOCUMENTS

| | | |
|---|---|---|
| JP | H11324755 | 11/1999 |
| JP | 2001336434 | 12/2001 |
| JP | 2015093597 | 5/2015 |

OTHER PUBLICATIONS

"Office Action of Japan Counterpart Application", dated Aug. 11, 2020, with English translation thereof, p. 1-p. 9.

(Continued)

*Primary Examiner* — Joseph J Dallo
(74) *Attorney, Agent, or Firm* — JCIPRNET

(57) ABSTRACT

A vehicle which can improve fuel consumption without a driver feeling uncomfortable is provided. The vehicle includes: a hydraulic pressure sensor for acquiring a brake torque value which increases in accordance with a stepping-in amount of a brake pedal by the driver, and an ECU which automatically stops an engine after a basic time has elapsed since a basic condition is satisfied and then automatically restarts the engine. The ECU automatically stops the engine before the basic time elapses, when an increment of the brake torque value from a reference value after the basic condition is satisfied is equal to or greater than an additional stepping judgment value, and a shortened time shorter than the basic time has elapsed.

5 Claims, 10 Drawing Sheets

(56) References Cited

U.S. PATENT DOCUMENTS

| | | | | |
|---|---|---|---|---|
| 2013/0006499 | A1* | 1/2013 | Date | F02D 41/042 |
| | | | | 701/104 |
| 2014/0229090 | A1* | 8/2014 | Rademacher | F02N 11/0822 |
| | | | | 701/112 |
| 2015/0148192 | A1* | 5/2015 | Lyon | F02N 11/0822 |
| | | | | 477/203 |
| 2015/0183434 | A1* | 7/2015 | Adamey | B60W 10/06 |
| | | | | 701/70 |
| 2015/0192081 | A1* | 7/2015 | Ranspach | F02D 41/18 |
| | | | | 60/274 |
| 2015/0360699 | A1* | 12/2015 | Sakai | B60W 10/184 |
| | | | | 701/70 |
| 2017/0320497 | A1* | 11/2017 | Khafagy | B60W 30/18072 |
| 2018/0023493 | A1* | 1/2018 | Khafagy | F16H 63/50 |
| | | | | 477/98 |
| 2018/0058353 | A1* | 3/2018 | Khafagy | F02D 41/065 |
| 2018/0347530 | A1* | 12/2018 | Le | F02N 11/084 |

OTHER PUBLICATIONS

"Office Action of Japan Counterpart Application", dated Jan. 6, 2021, with English translation thereof, pp. 1-8.

* cited by examiner

START AND STOP CONTROL FOR A VEHICLE

CROSS REFERENCE TO RELATED APPLICATIONS

This application claims the priority benefit of Japanese Patent Application No. 2019-080803, filed on Apr. 22, 2019. The entirety of the above-mentioned patent application is hereby incorporated by reference herein and made a part of this specification.

BACKGROUND OF THE DISCLOSURE

Technical Field

The disclosure relates to a vehicle. More specifically, the disclosure relates to a vehicle having an idle stop function for automatically stopping or automatically restarting an internal combustion engine.

Related Art

Many vehicles mounted with an internal combustion engine have a so-called idle stop function for suppressing fuel consumption in the internal combustion engine. The idle stop function means that the internal combustion engine is automatically stopped by stopping fuel injection when a predetermined automatic stop condition (for example, the vehicle is stopped) is satisfied, and then the internal combustion engine is automatically restarted by restarting fuel injection while cranking with a starter when a predetermined automatic restart condition is satisfied.

Here, in order to improve the fuel consumption of the internal combustion engine as much as possible, it is preferable to automatically stop the internal combustion engine as soon as the automatic stop condition is satisfied. However, in this case, a driver may feel uncomfortable. Specifically, for example, when the vehicle is put in a garage or when a direction of the vehicle is changed, the vehicle is temporarily stopped to switch transmission between forward and reverse, and the automatic stop condition may be satisfied, but if the internal combustion engine is automatically stopped even in this case, the driver will feel uncomfortable. Therefore, in many vehicles, the internal combustion engine is automatically stopped after a predetermined time has elapsed since the automatic stop condition is satisfied (for example, see patent literature 1: Japanese Patent Laid-Open No. 2001-336434).

In addition, when putting the vehicle into a garage or changing the direction of the vehicle as described above, time for temporarily stopping the vehicle changes depending on drivers. Therefore, patent literature 1 (Japanese Patent Application Laid-Open No. 2001-336434) discloses a vehicle including a manual timer which allows a driver to manually set the time since the automatic stop condition is satisfied until the internal combustion engine is actually automatically stopped.

However, an optimum set time since the automatic stop condition is satisfied until the internal combustion engine is automatically stopped is not always constant and changes depending on situation or environment. That is, for example, if the set time is shortened assuming signal waiting, the fuel consumption can be improved without the feeling of uncomfortable during the signal waiting, but there is a possibility that the internal combustion engine automatically stops in contrary to an intention of the driver at the time of temporary stop, traffic jams, garage entering, and direction change, and the driver feels uncomfortable.

The disclosure provides a vehicle which can improve fuel consumption without the driver feeling uncomfortable.

SUMMARY

A vehicle according to the disclosure includes: an operation parameter acquisition part for acquiring an operation parameter value which increases in accordance with an operation amount of a brake; and an automatic stop-start control device which automatically stops an internal combustion engine after a basic time has elapsed since a basic condition is satisfied, and then automatically restarts the internal combustion engine, wherein the automatic stop-start control device automatically stops the internal combustion engine before the basic time elapses when the operation parameter value has increased since the basic condition is satisfied.

DESCRIPTION OF THE EMBODIMENTS

An embodiment of the disclosure is described below with reference to the drawings.

Figure 1:
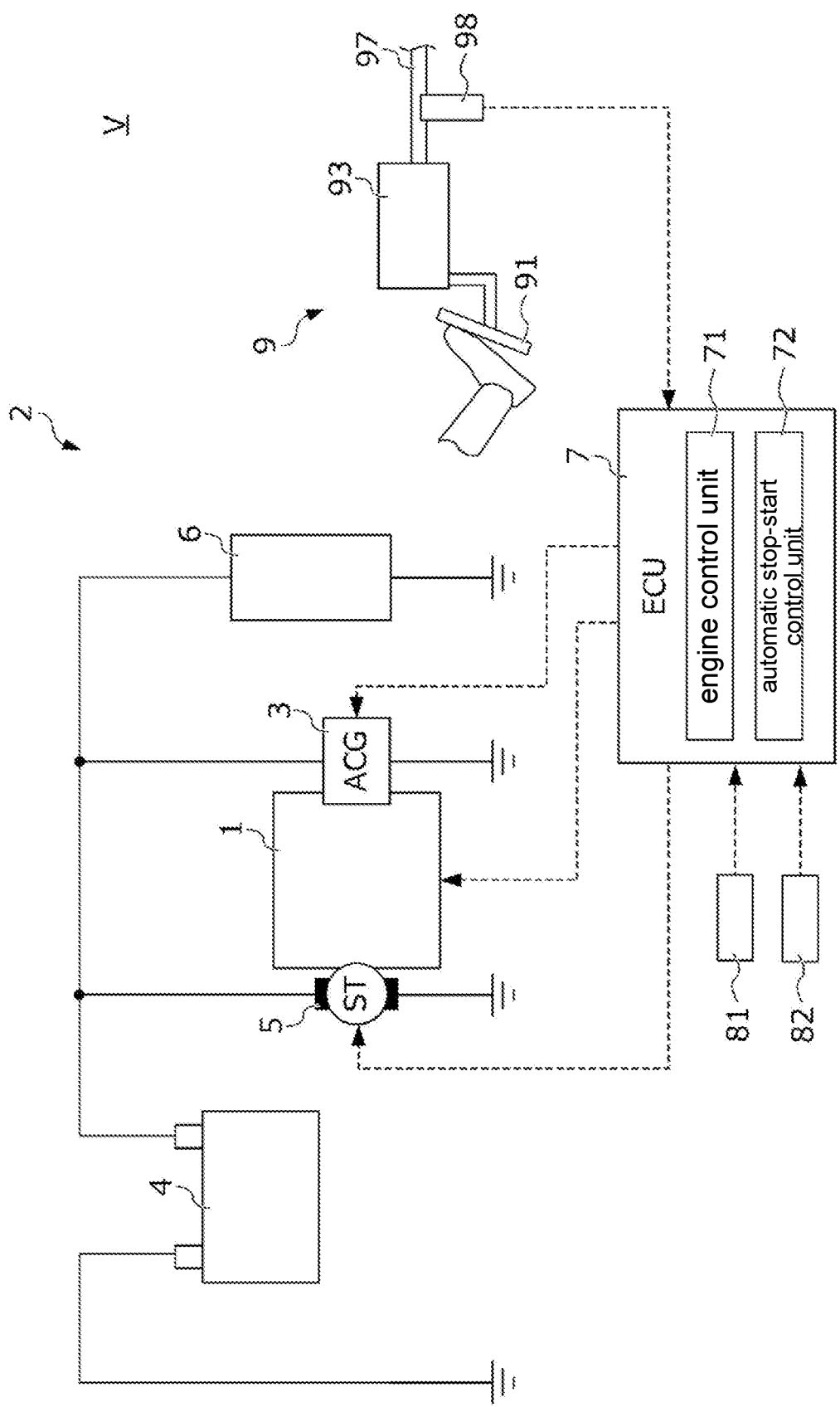
FIG. 1 is a diagram illustrating a configuration of a vehicle according to an embodiment of the disclosure.

FIG. 1 is a diagram illustrating a configuration of a vehicle V according to the embodiment. Mounted on the vehicle V are an internal combustion engine (hereinafter referred to as "the engine 1") that generates a driving force for traveling, a control device 2 of the engine 1, a vehicle speed sensor 81 that detects a vehicle speed of the vehicle V, and a longitudinal acceleration sensor 82 that detects acceleration, and a braking system 9 that performs braking control in accordance with an operation of a brake pedal 91 by a driver.

The control device 2 includes an alternator (hereinafter, abbreviated as the "ACG 3") that generates electricity using power of the engine 1, a battery 4 that can be charged by electric power generated using the ACG 3, a starter 5 that starts the engine 1 using the electric power supplied from the battery 4, an electric load 6 that can operate using the electric power supplied from the battery 4, and an ECU 7 that is a computer for controlling the above parts.

The braking system 9 includes the brake pedal 91 on which the driver performs a stepping operation when braking the vehicle V, a brake booster 93 that is arranged in a hydraulic pressure circuit 97 that connects the brake pedal 91 and a brake caliper which is not shown, and a hydraulic pressure sensor 98 arranged in the hydraulic pressure circuit 97.

The brake booster 93 uses a negative pressure generated in an intake system of the engine 1 in operation to increase a stepping force acting on the brake pedal 91 and transmit the stepping force to the brake caliper to brake the vehicle V. The hydraulic pressure sensor 98 transmits to the ECU 7 a signal that increases corresponding to the hydraulic pressure in the hydraulic pressure circuit 97, in other words, a signal that increases corresponding to the stepping-in amount of the brake pedal 91 by the driver. The ECU 7 calculates a brake torque value equivalent to a hydraulic pressure value in the hydraulic pressure circuit 97 based on the signal transmitted from the hydraulic pressure sensor 98. Therefore, in the embodiment, an operation parameter value is equivalent to the brake torque value, and an operation parameter acquisition part for acquiring the brake torque value is configured by the hydraulic pressure sensor 98 and the ECU 7.

The ACG 3 is connected to a crankshaft of the engine 1 via a belt which is not shown, and generates electricity by being driven to rotate by the crankshaft. The ACG 3 is configured of a regulator, a rotor coil, and the like. The ECU 7 adjusts a current flowing through the rotor coil by controlling on/off of a switch of the regulator, and consequently adjusts the electric power generated by the ACG 3. Moreover, an output voltage of the ACG 3 is set higher than a voltage of the battery 4 so that the battery 4 can be charged by the electric power generated by the ACG 3.

The battery 4 is a secondary battery capable of both discharging for converting chemical energy into electric energy and charging for converting electric energy into chemical energy. In the embodiment, a case where a lead battery using lead as an electrode is used as the battery 4 is described, but the disclosure is not limited hereto. As the battery 4, a known secondary battery such as a so-called lithium ion battery or the like that performs charging and discharging by moving lithium ions between electrodes may be used.

The starter 5 is a cell motor that starts the engine 1 with the electric power supplied from the battery 4. The ECU 7 supplies the electric power from the battery 4 to the starter 5 and starts the engine 1 when the driver switches an ignition (not shown) on to start the vehicle V or when the engine 1 is restarted after the engine 1 is automatically stopped by an automatic stop process described later.

The electric load 6 is configured by a variety of electrical equipment mounted on the vehicle V, for example, lights, air conditioners, navigation systems, electric power steering, and acoustic equipment.

The vehicle speed sensor 81 detects the vehicle speed, which is a moving speed along a traveling direction of the vehicle V, based on a rotational speed of drive wheels (not shown) of the vehicle V and transmits a signal corresponding to the detected value to the ECU 7. For the vehicle speed sensor 81, for example, an encoder is used that generates a pulse signal proportional to the rotational speed of axle of the drive wheels.

The longitudinal acceleration sensor 82 is attached to a vehicle body of the vehicle V, detects acceleration along the traveling direction of the vehicle body, and transmits a signal corresponding to the detected value to the ECU 7. The longitudinal acceleration sensor 82 may be, for example, a sensor which is a uniaxial acceleration sensor and is attached to the vehicle body in a manner that a detection axis of the sensor is parallel to the traveling direction. A detected value of this longitudinal acceleration sensor 82 is 0 when the vehicle V is stopped on a flat road surface with a gradient angle of 0, is a negative value when the vehicle V is stopped on an uphill road surface with a positive gradient angle, and is a positive value when the vehicle V is stopped on a downhill road surface with a negative gradient angle. Thus, the ECU 7 calculates a gradient angle of the road surface where the vehicle V is stopped based on the signal transmitted from the longitudinal acceleration sensor 82.

The ECU 7 is a computer in which an engine control unit 71 which is a control module responsible for fuel injection control and ignition timing control of the engine 1 and an automatic stop-start control unit 72 which is a control module responsible for idle stop control of the engine 1 are configured.

The engine control unit 71 performs, based on a known algorithm, the fuel injection control for controlling a fuel injection amount and a fuel injection timing of a fuel injection valve (not shown) arranged in the engine 1 and the ignition timing control for controlling the ignition timing of an ignition plug (not shown) arranged in the engine 1.

The automatic stop-start control unit 72 automatically stops the engine 1 at a predetermined timing by executing the automatic stop process shown in FIG. 2 described later while the engine 1 is operating under the control of the engine control unit 71. In addition, the automatic stop-start control unit 72 judges whether a predetermined automatic restart condition is satisfied after the engine 1 is automatically stopped. When the automatic restart condition is satisfied, the automatic stop-start control unit 72 cranks the engine 1 by driving the starter 5 and automatically restarts the engine 1 by restarting the fuel injection control and the ignition timing control performed by the engine control unit 71. Here, the automatic restart condition includes, for example, that an accelerator pedal is stepped on, that the stepping of the brake pedal 91 is released, and the like.

Figure 2A:
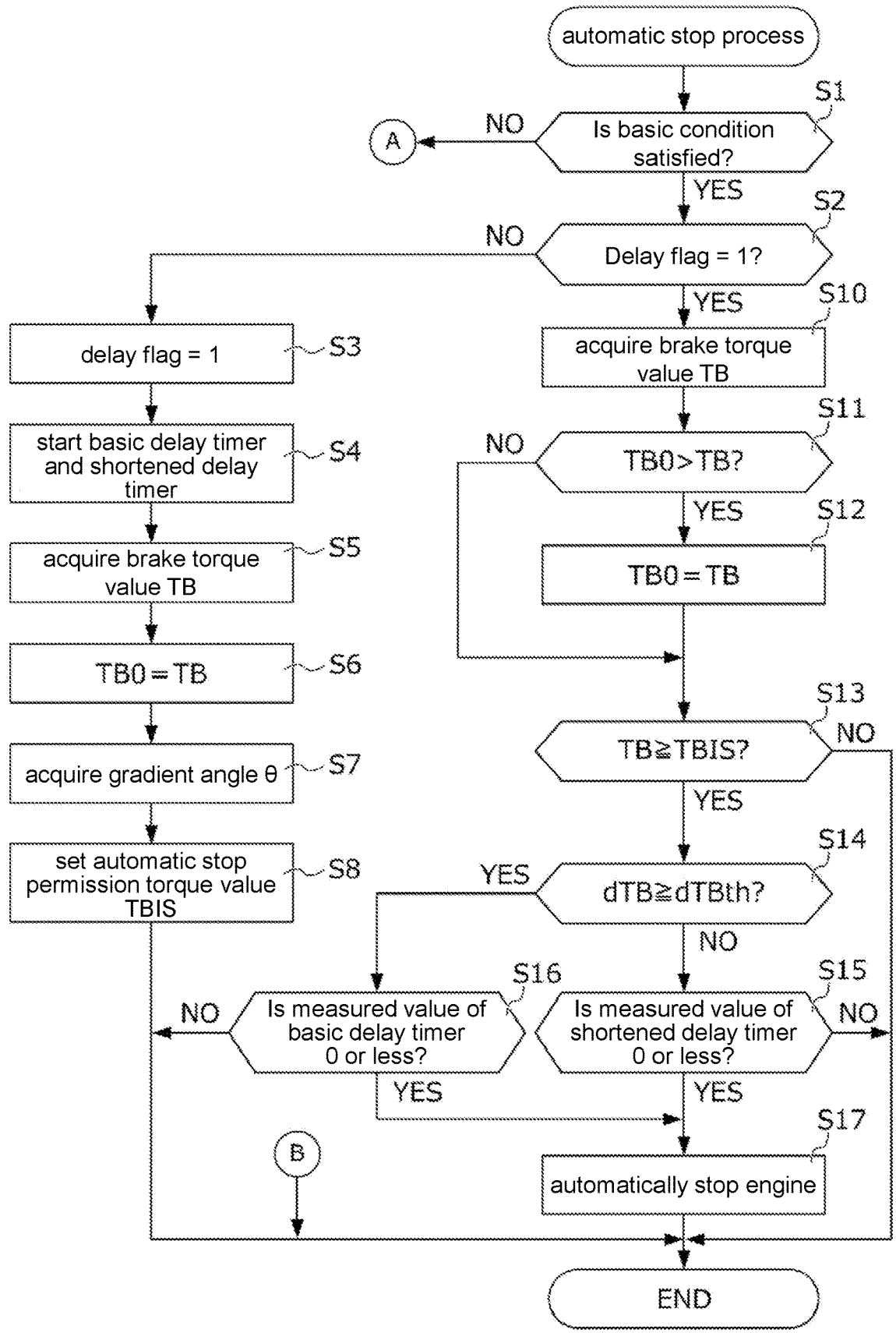
FIG. 2A is a flowchart (part 1) illustrating a specific procedure of an automatic stop process.
Figure 2B:
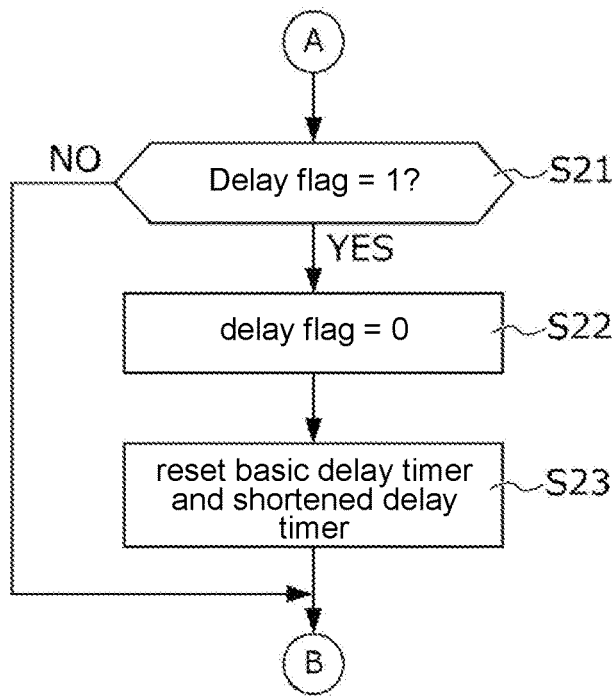
FIG. 2B is a flowchart (part 2) illustrating a specific procedure of the automatic stop process.

FIG. 2A and FIG. 2B are flowcharts showing a specific procedure of the automatic stop process. The automatic stop process is repeatedly executed under a predetermined control cycle by the automatic stop start control unit 72 while the engine 1 is operating. In addition, as described specifically below, the automatic stop-start control unit 72 judges whether a basic condition that is a part of conditions for permitting the automatic stop of the engine 1 is satisfied, and when the basic condition is satisfied, the automatic stop-start control unit 72 automatically stops the engine 1 after a predetermined delay time has elapsed since the basic condition is satisfied.

First, in S1, the automatic stop-start control unit 72 judges whether the basic condition is satisfied. Here, the basic condition includes, for example, that the vehicle V is stopped (more specifically, the vehicle speed is 0 [km/h]), the accelerator pedal of the vehicle V is not stepped on, and a charging rate of the battery 4 is equal to or greater than a predetermined value. The automatic stop-start control unit 72 proceeds to S2 when a judgment result of S1 is YES.

In S2, the automatic stop-start control unit 72 judges whether a value of a delay flag is 1. The delay flag is a flag which clearly indicates that the above basic condition has been satisfied and the above delay time has not elapsed, and the delay flag is updated in S3 and S22 described later.

When a judgment result in S2 is NO, that is, when the basic condition is satisfied for the first time in the present control cycle, the automatic stop-start control unit 72 proceeds to S3. In S3, the automatic stop-start control unit 72 sets the value of the delay flag to 1, and proceeds to S4. In S4, the automatic stop-start control unit 72 starts a basic delay timer and a shortened delay timer in response to the situation that the basic condition is satisfied for the first time in the present control cycle, and proceeds to S5. The basic delay timer and the shortened delay timer are counter timers that measure a time elapsed since the basic condition is satisfied by subtracting a time elapsed since the start from each initial value. Here, the initial value of the basic delay timer is set to a predetermined basic time T1, and the initial value of the shortened delay timer is set to a predetermined shortened time T2 shorter than the basic time T1. Therefore, the measured value of the shortened delay timer becomes 0 when the shortened time T2 elapses since the basic condition is satisfied for the first time, and the measured value of the basic delay timer becomes 0 when the basic time T1 elapses since the basic condition is satisfied for the first time.

In S5, the automatic stop-start control unit 72 acquires a brake torque value TB at present, and proceeds to S6. In S6, the automatic stop-start control unit 72 sets a reference value TB0 to the brake torque value TB acquired in S5, that is, the brake torque value TB when a reference condition is satisfied for the first time, and proceeds to S7.

In S7, the automatic stop-start control unit 72 acquires a gradient angle θ of a road surface on which the vehicle V is stopped, and proceeds to S8. In S8, the automatic stop-start control unit 72 sets, based on the gradient angle θ acquired in S7, an automatic stop permission torque value TBIS which is a threshold value with respect to the brake torque value TB, and ends the automatic stop process.

Figure 3:
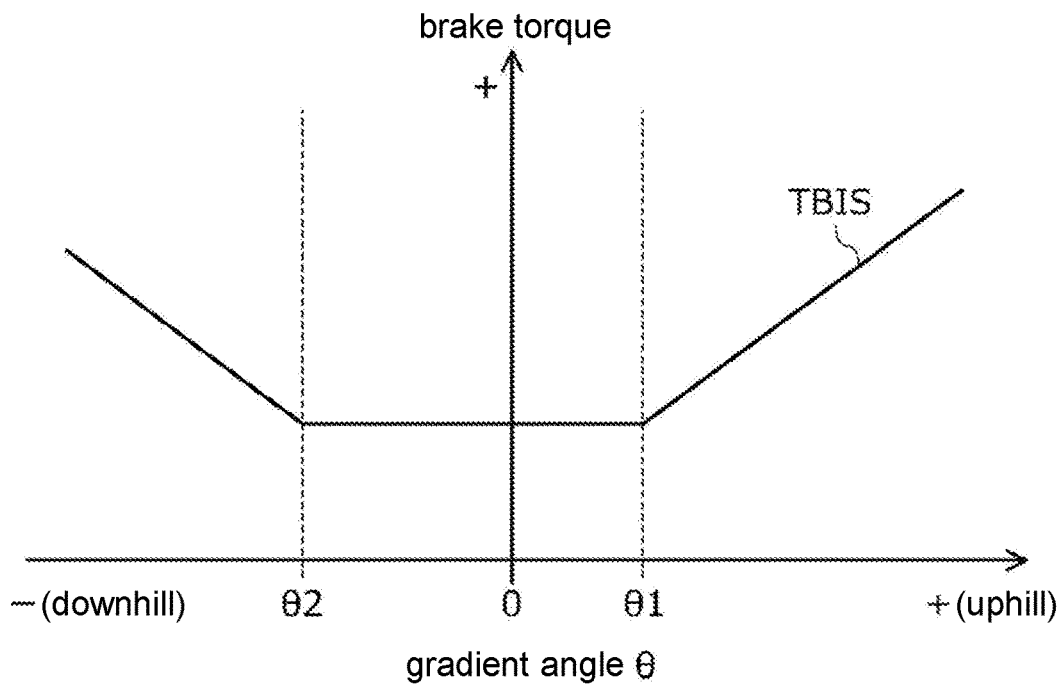
FIG. 3 is an example of a map for setting an automatic stop permission torque value based on a gradient angle.

FIG. 3 is an example of a map for setting the automatic stop permission torque value based on the gradient angle θ. The automatic stop-start control unit 72 sets, based on the gradient angle θ, the automatic stop permission torque value TBIS by, for example, searching the map shown in FIG. 3. As shown in FIG. 3, when the road surface is uphill, the gradient angle θ is a positive value, and when the road surface is downhill, the gradient angle θ is a negative value. The automatic stop-start control unit 72 sets the automatic stop permission torque value TBIS to the predetermined value when the gradient angle θ is equal to or smaller than a first set angle θ1 which is a positive value and greater than a second set angle θ2 which is a negative value. In addition, when the gradient angle θ is greater than the first set angle θ1, the automatic stop-start control unit 72 sets the automatic stop permission torque value TBIS to a greater value as the gradient angle θ becomes greater. In addition, when the gradient angle θ is equal to or smaller than the second set angle θ2, the automatic stop-start control unit 72 sets the automatic stop permission torque value TBIS to a greater value as the gradient angle θ becomes smaller.

When a judgment result of S2 is YES, that is, when the basic condition is satisfied following the previous control cycle, the automatic stop-start control unit 72 proceeds to S10. In S10, the automatic stop-start control unit 72 acquires the brake torque value TB at present and proceeds to S11.

In S11, the automatic stop-start control unit 72 judges whether the brake torque value TB at present acquired in S10 is smaller than the reference value TB0. If a judgment result in S11 is YES, the automatic stop-start control unit 72 sets the reference value TB0 to the brake torque value TB acquired in S10 (see S12), and proceeds to S13. If the judgment result in S11 is NO, the automatic stop-start control unit 72 proceeds to S13 while maintaining the reference value TB0 at the present value. Thereby, the reference value TB0 is updated to be the minimum value of the brake torque value TB after the basic condition is satisfied.

In S13, the automatic stop-start control unit 72 judges whether the brake torque value TB is equal to or greater than the automatic stop permission torque value TBIS. The automatic stop-start control unit 72 ends the automatic stop process when a judgment result of S13 is NO, and proceeds to S14 when the judgment result of S13 is YES. Therefore, the automatic stop-start control unit 72 does not automatically stop the engine 1 if the brake pedal 91 is not stepped on to an extent that at least the brake torque value TB is equal to or greater than the automatic stop permission torque value TBIS.

In S14, the automatic stop-start control unit 72 judges whether a brake torque increment dTB (=TB−TB0) obtained by subtracting the reference value TB0 from the brake torque value TB is equal to or greater than a predetermined additional stepping judgment value dTBth.

When a judgment result in S14 is NO, that is, when the additional stepping of the brake pedal 91 does not reach an extent that the brake torque increment dTB is equal to or greater than the additional stepping judgment value dTBth, the automatic stop-start control unit 72 proceeds to S15. In S15, the automatic stop-start control unit 72 judges whether the measured value of the basic delay timer is 0 or lower, that is, whether the basic time T1 has elapsed since the basic condition is satisfied. The automatic stop-start control unit 72 ends the automatic stop process when a judgment result of S15 is NO, and automatically stops the engine 1 (see S17) and ends the automatic stop judgment process when the judgment result of S15 is YES.

When the judgment result in S14 is YES, that is, when the additional stepping of the brake pedal 91 reaches an extent that the brake torque increment dTB is equal to or greater than the additional stepping judgment value dTBth, the automatic stop-start control unit 72 proceeds to S16. In S16, the automatic stop-start control unit 72 judges whether the measured value of the shortened delay timer is 0 or lower, that is, whether the shortened time T2 has elapsed since the basic condition is satisfied. The automatic stop-start control unit 72 ends the automatic stop process (see S17) when the judgment result in S16 is NO, and automatically stops the engine 1 (see S17) and ends the automatic stop judgment process when the judgment result of S16 is YES. As described above, the shortened time T2 is shorter than the basic time T1. Accordingly, the automatic stop-start control unit 72 automatically stops the engine 1 before the basic time T1 elapses, when the increment dTB of the brake torque value TB from the reference value TB0 after the basic condition is satisfied is greater than or equal to the judgment value dTBth and the shortened time T2 has elapsed since the basic condition is satisfied.

Returning to S1, when the judgment result in S1 is NO, the automatic stop-start control unit 72 proceeds to 521. In 521, the automatic stop-start control unit 72 judges whether the value of the delay flag is 1. The automatic stop-start control unit 72 ends the automatic stop judgment process when a judgment result in S21 is YES, that is, when the basic condition is not satisfied following the previous control cycle.

When the judgment result in S21 is NO, that is, when the basic condition is not satisfied for the first time in the present control cycle, the automatic stop-start control unit 72 proceeds to S22. In S22, the automatic stop-start control unit 72 resets the value of the delay flag to 0 and proceeds to S23. In S23, the automatic stop-start control unit 72 resets the measured values of the basic delay timer and the shortened delay timer to their initial values and proceeds to S24. Thereby, the automatic stop-start control unit 72 resets the measured values of the basic delay timer and the shortened delay timer when the basic condition is not satisfied during a period until the basic time T1 or the shortened time T2 has elapsed since the basic condition is satisfied for the first time.

Next, a specific example of the automatic stop process is described with reference to time charts of FIG. 4-FIG. 10. FIG. 4-FIG. 10 show the time charts of the vehicle speed, the brake torque value, the measured values of the basic delay timer and the shortened delay timer, and whether the engine 1 is automatically stopped when the brake pedal 91 is operated in different modes by the driver.

Figure 4:
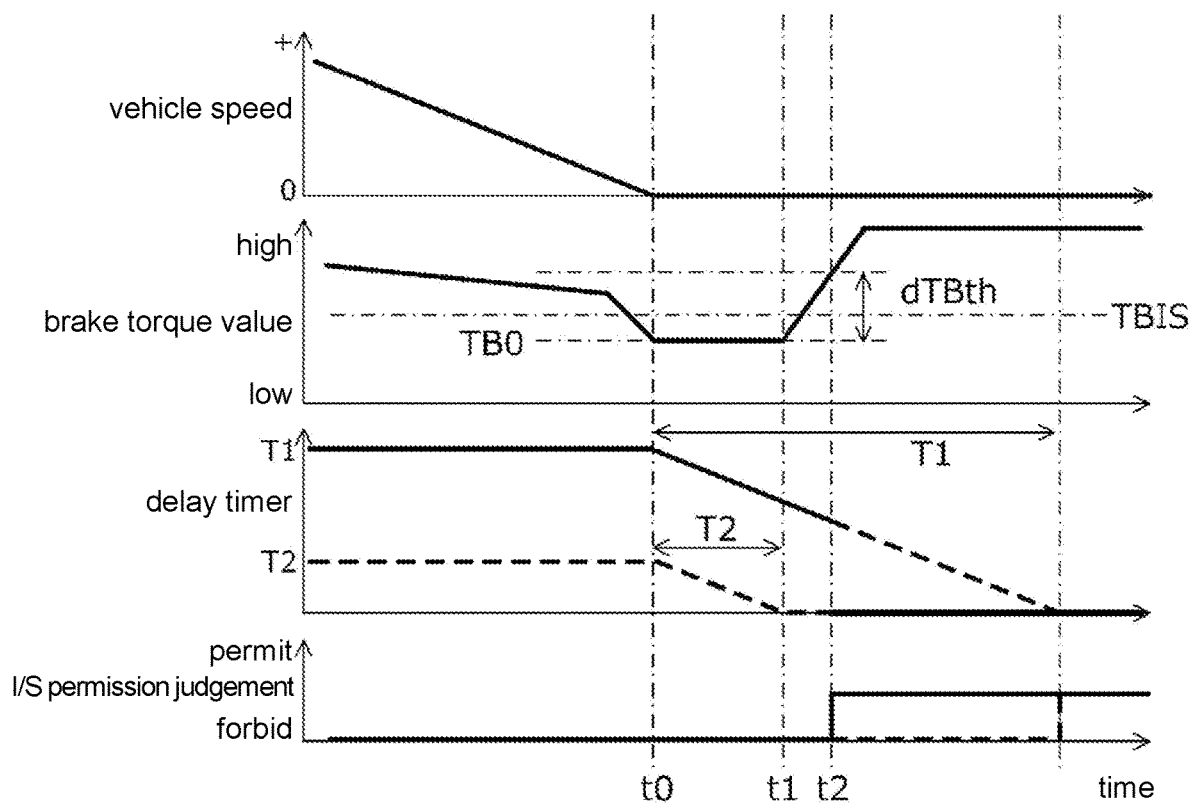
FIG. 4 is a time chart when a brake pedal is strongly additionally stepped on after the vehicle is stopped.

FIG. 4 is a time chart when the brake pedal 91 is strongly additionally stepped on after the vehicle V is stopped. The example of FIG. 4 shows a case where the driver decelerates by stepping on the brake pedal 91 and the vehicle V is stopped at a time point t0. The automatic stop-start control unit 72 starts the basic delay timer and the shortened delay timer (see S4) in response to the situation that the vehicle speed is 0 at the time point t0 and the basic condition is satisfied, sets the reference value TB0 to the brake torque value TB at that time (see S6), and further sets the automatic stop permission torque value TBIS based on the gradient angle θ (see S8).

Thereafter, at a time point t1, the measured value of the shortened delay timer becomes 0, that is, the shortened time T2 has elapsed after the basic condition is satisfied for the first time. However, the brake pedal 91 is not stepped on and the brake torque value TB is constant since the vehicle V is stopped at the time point t0 until the time point t1, and thus the driver refers to the basic delay timer instead of referring to the shortened delay timer to determine the timing for automatically stopping the engine 1 (see S14 and S15).

In addition, after the time point t1, the driver starts to additionally step on the brake pedal 91, and thereby the brake torque value TB starts to increase. Thereafter, at a time point t2, the brake torque value TB increases from the reference value TB0 which is the minimum value of the brake torque value TB until then to be equal to or greater than the additional stepping judgment value dTBth (see S14). Thereby, at the time point t2, the automatic stop-start control unit 72 judges whether it is time to automatically stop the engine 1 by referring to the measured value of the shortened delay timer (see S16). In addition, at the time point t2, the shortened time T2 has already elapsed since the basic condition is satisfied, and thus the automatic stop-start control unit 72 automatically stops the engine 1 before the basic time T1 elapses.

Figure 5:
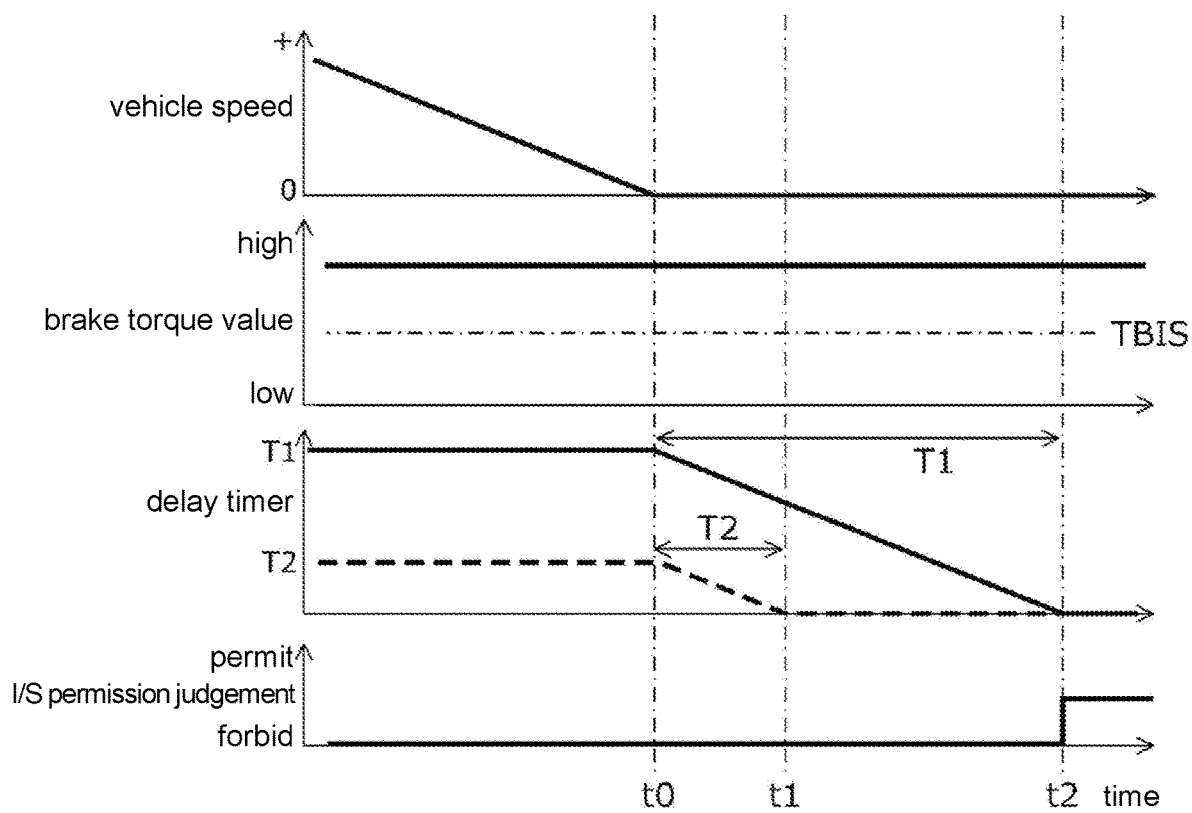
FIG. 5 is a time chart when the brake pedal is stepped on with a constant force before and after the vehicle is stopped.

FIG. 5 is a time chart when the brake pedal 91 is stepped on with a constant force before and after the vehicle V is stopped. The example of FIG. 5 shows a case where the driver decelerates by stepping on the brake pedal 91 and the vehicle V is stopped at the time point t0. The automatic stop-start control unit 72 starts the basic delay timer and the shortened delay timer in response to the situation that the vehicle speed becomes 0 at the time point t0 and the basic condition is satisfied (see S4), and further sets the automatic stop permission torque value TBIS based on the gradient angle θ (see S8).

Thereafter, the measured value of the shortened delay timer becomes 0 at the time point t1, and then the measured value of the basic delay timer becomes 0 at the time point t2. In addition, as described above, in the example of FIG. 5, the driver steps on the brake pedal 91 with a constant force, and thus the brake torque value TB is constant from the time point t0 to the time point t2. Therefore, the automatic stop-start control unit 72 determines the timing for automatically stopping the engine 1 by referring to the basic delay timer since the basic condition is satisfied at the time point t0 until the basic time T1 has elapsed at the time point t2 (see S14 and S15). Therefore, the automatic stop-start control unit 72 automatically stops the engine 1 at the time point t2 when the basic time T1 has elapsed since the basic condition is satisfied.

Figure 6:
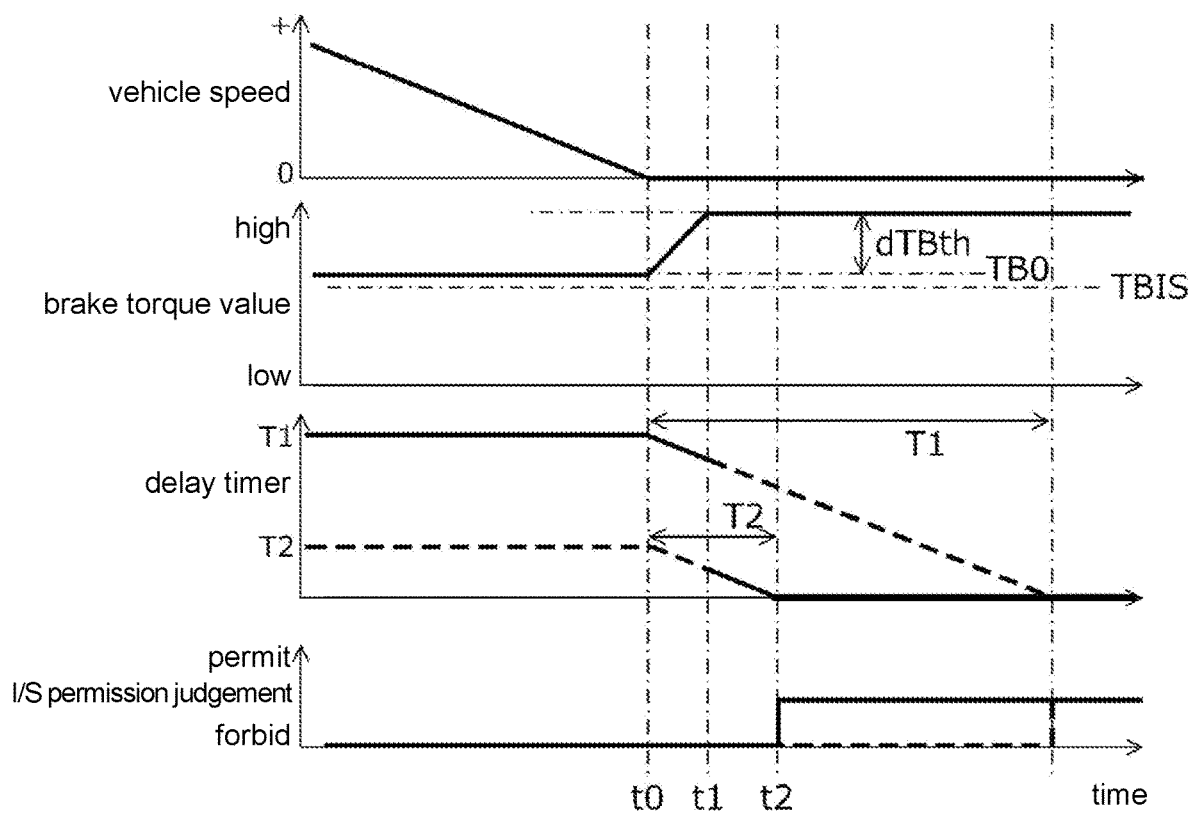
FIG. 6 is a time chart when the brake pedal is additionally stepped on at an earlier timing than in the example of FIG. 4 after the vehicle is stopped.

FIG. 6 is a time chart when the brake pedal 91 is stepped on at a timing earlier than the example of FIG. 4 after the vehicle V is stopped. The example of FIG. 6 shows a case where the driver decelerates by stepping on the brake pedal 91 and the vehicle V is stopped at the time point t0. The automatic stop-start control unit 72 starts the basic delay timer and the shortened delay timer in response to the situation that the vehicle speed becomes 0 at the time point t0 and the basic condition is satisfied (see S4), sets the reference value TB0 to the brake torque value TB at that time (see S6), and further sets the automatic stop permission torque value TBIS based on the gradient angle θ (see S8).

In addition, after the time point t0, the driver starts to additionally step on the brake pedal 91, and thereby the brake torque value TB starts to increase. Thereafter, at the time point t1, the brake torque value TB increases from the reference value TB0 which is the minimum value of the brake torque value TB until then to be equal to or greater than the additional stepping judgment value dTBth (see S14). Thereby, after the time point t1, the automatic stop-start control unit 72 judges whether it has reached the time to automatically stop the engine 1 by referring to the measured value of the shortened delay timer (see S16). Thereafter, at the time point t2, the automatic stop-start control unit 72 automatically stops the engine 1 before the basic time T1 elapses in response to the situation that the shortened time T2 has elapsed since the basic condition is satisfied for the first time at the time point t0.

Figure 7:
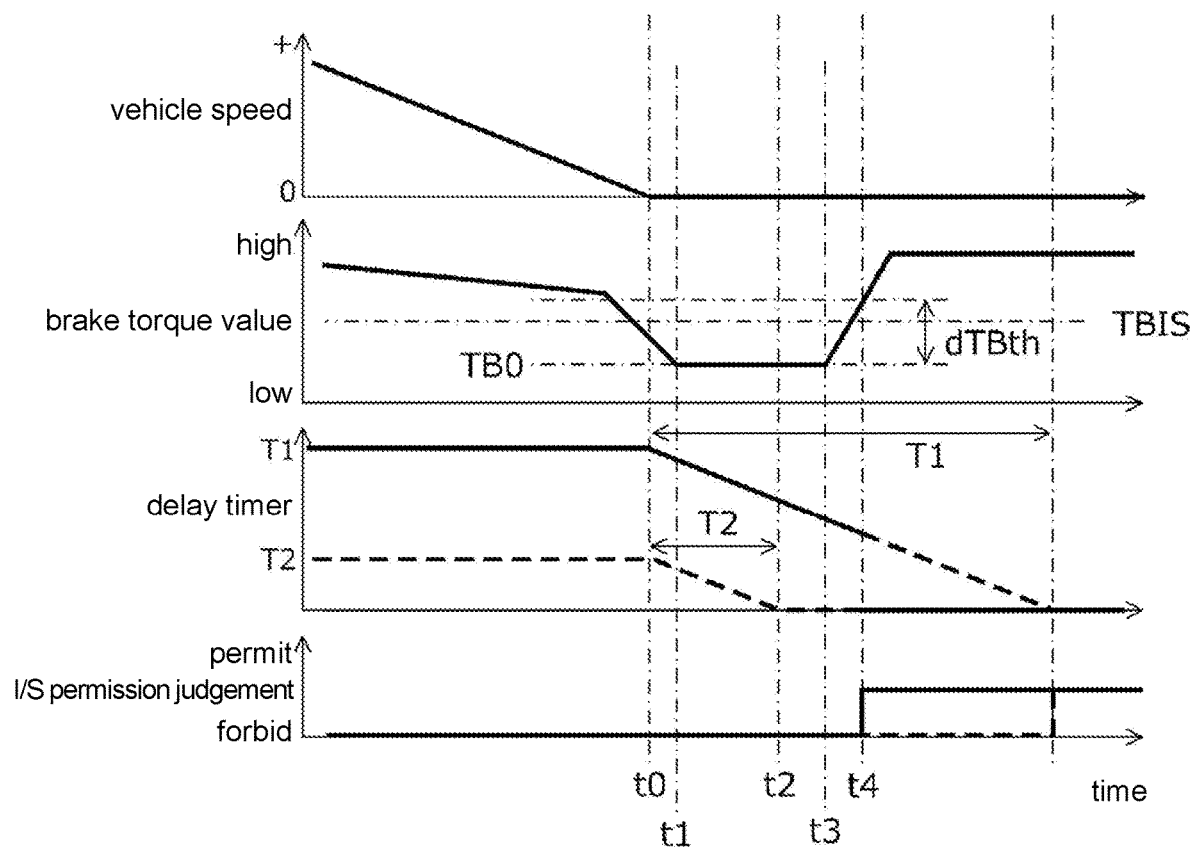
FIG. 7 is a time chart when the brake pedal is additionally stepped on after the stepping of the brake pedal is temporarily released after the vehicle is stopped.

FIG. 7 is a time chart when the brake pedal 91 is additionally stepped on after the stepping of the brake pedal 91 is temporarily released after the vehicle V is stopped. The example of FIG. 7 shows a case where the driver releases the stepping of the brake pedal 91 immediately before the vehicle V is stopped at the time point t0. The automatic stop-start control unit 72 starts the basic delay timer and the shortened delay timer in response to the situation that the vehicle speed becomes 0 at the time point t0 and the basic condition is satisfied (see S4), sets the reference value TB0 to the brake torque value TB at that time (see S6), and further sets the automatic stop permission torque value TBIS based on the gradient angle θ (see S8).

In the example of FIG. 7, the driver releases the stepping of the brake pedal 91 immediately before the vehicle V is stopped at the time point t0, and thus the brake torque value TB further decreases after the time point t0 and becomes the minimum value at the time point t1. Therefore, the automatic stop-start control unit 72 sets the reference value TB0 to the brake torque value TB at the time point t1 (see S11 and S12).

Thereafter, at the time point t2, the measured value of the shortened delay timer becomes 0. Thereafter, after a time point t3, the driver starts to additionally step on the brake pedal 91, and thereby the brake torque value TB starts to increase. Thereafter, at a time point t4, the brake torque value TB increases from the reference value TB0 which is the minimum value of the brake torque value TB until then to be equal to or greater than the additional stepping judgment value dTBth (see S14). Thereby, at the time point t4, the automatic stop-start control unit 72 judges whether it has reached the time to automatically stop the engine 1 by referring to the measured value of the shortened delay timer (see S16). In addition, at the time point t4, the shortened time T2 has already elapsed since the basic condition is satisfied, and thus the automatic stop-start control unit 72 automatically stops the engine 1 before the basic time T1 elapses.

Figure 8:
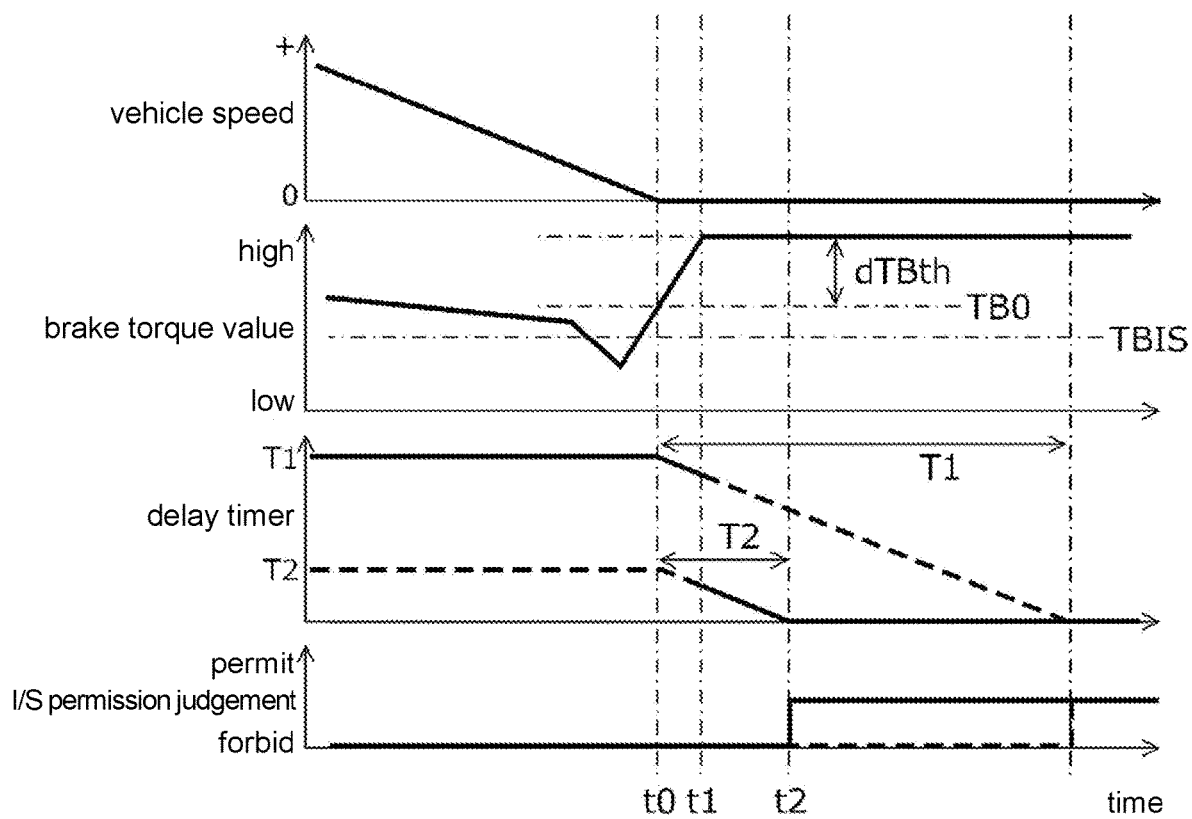
FIG. 8 is a time chart when the brake pedal is strongly additionally stepped on immediately before the vehicle is stopped.

FIG. 8 is a time chart when the brake pedal 91 is strongly additionally stepped on immediately before the vehicle V is stopped. The example of FIG. 8 shows a case where the driver decelerates by stepping on the brake pedal 91 and the brake pedal 91 is additionally stepped on immediately before the vehicle V is stopped at the time point t0. The automatic stop-start control unit 72 starts the basic delay timer and the shortened delay timer in response to the situation that the vehicle speed becomes 0 at the time point t0 and the basic condition is satisfied (see S4), sets the reference value TB0 to the brake torque value TB at that time (see S6), and further sets the automatic stop permission torque value TBIS based on the gradient angle θ (see S8).

In the example of FIG. 8, the driver additionally steps on the brake pedal 91 immediately before the vehicle V is stopped at the time point t0, and thus the brake torque value TB further increases after the time point t0. Thereafter, at the time point t1, the brake torque value TB increases from the reference value TB0 which is the minimum value of the brake torque value TB after the time point t0 when the basic condition is satisfied to be equal to or greater than the additional stepping judgment value dTBth (see S14). Thereby, after the time point t1, the automatic stop-start control unit 72 judges whether it has reached the time to automatically stop the engine 1 by referring to the measured value of the shortened delay timer (see S16). Thereafter, at the time point t2, the automatic stop-start control unit 72 automatically stops the engine 1 before the basic time T1 elapses in response to the situation that the shortened time T2 has elapsed since the basic condition is satisfied.

Figure 9:
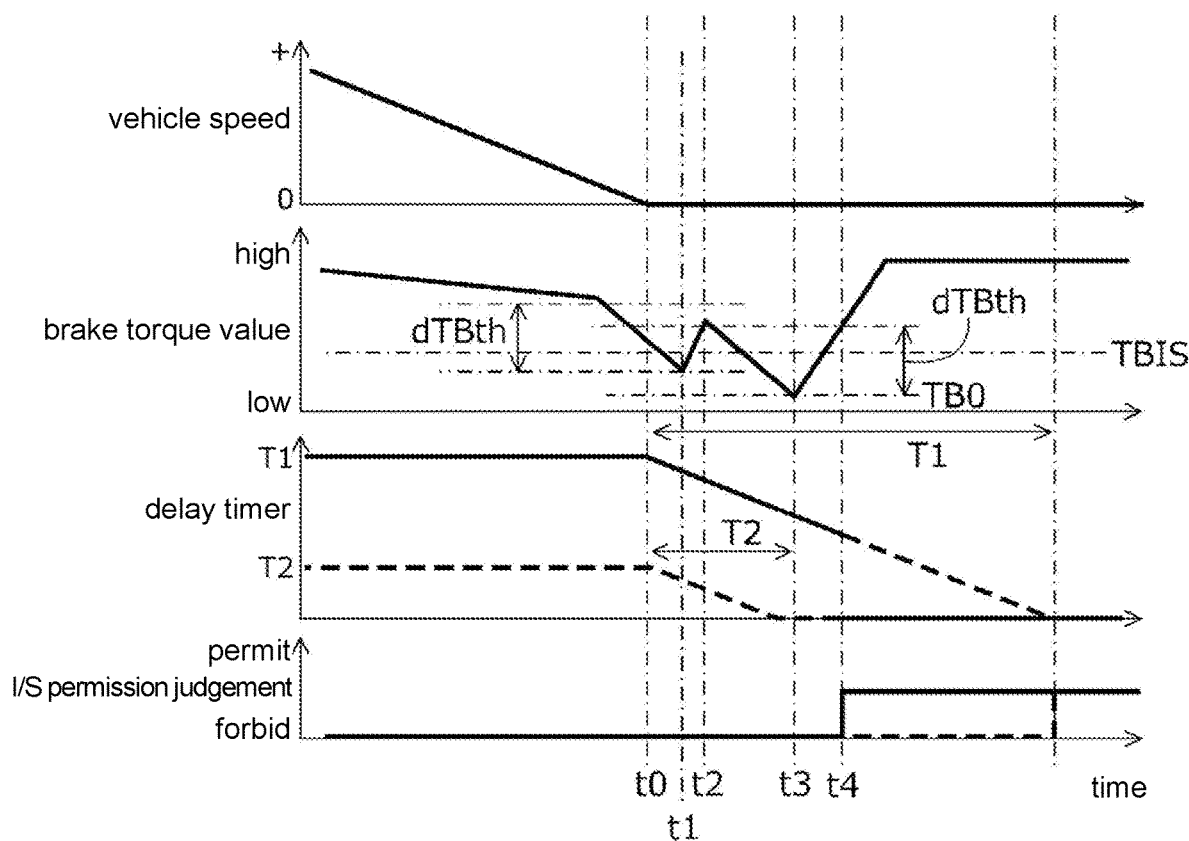
FIG. 9 is a time chart when the brake pedal is stepped on or released after the vehicle is stopped.

FIG. 9 is a time chart when the brake pedal 91 is stepped on or released after the vehicle V is stopped. The example of FIG. 9 shows a case where the driver decelerates by stepping on the brake pedal 91 and the vehicle V is stopped at the time point t0. The automatic stop-start control unit 72 starts the basic delay timer and the shortened delay timer in response to the situation that the vehicle speed becomes 0 at the time point t0 and the basic condition is satisfied (see S4), sets the reference value TB0 to the brake torque value TB at that time (see S6), and further sets the automatic stop permission torque value TBIS based on the gradient angle θ (see S8).

In the example of FIG. 9, the driver releases the stepping of the brake pedal 91 immediately before the vehicle V is stopped at the time point t0, and thus the brake torque value TB decreases after the time point t0. In addition, thereafter, after the time point t1, the driver starts additional stepping of the brake pedal 91, and thus the brake torque value TB starts to increase. In addition, thereafter, after the time point t2, the driver releases the stepping of the brake pedal 91, and thus the brake torque value TB decreases again after the time point t2.

Accordingly, the minimum value of the brake torque value TB between the time points t0 and t2 is the value at the time point t1. The automatic stop-start control unit 72 judges whether the brake pedal 91 is additionally stepped on using the brake torque value TB at the time point t1 as the reference value TB0 between the time points t0 and t2. In addition, although the brake pedal 91 is additionally stepped on between the time points t1 and t2, an increment of the brake torque value TB based on the reference value TB0 is equal to or smaller than the additional stepping judgment value dTBth. Therefore, between the time points t0 and t2, the automatic stop-start control unit 72 refers to the basic delay timer to determine the time to automatically stop the engine 1.

The driver releases the stepping of the brake pedal 91 after the time point t2, and then starts the additional stepping of the brake pedal 91 again after the time point t3. In addition, at the time point t3, the brake torque value TB is smaller than the value at the time point t1. Therefore, after the time point t3, the automatic stop-start control unit 72 judges whether the brake pedal 91 is additionally stepped on using the brake torque value TB at the time point t3 as the reference value TB0. Thereafter, at the time point t4, the brake torque value TB increases from the reference value TB0 which is the minimum value of the brake torque value TB until then to be equal to or greater than the additional stepping judgment value dTBth (see S14). Thereby, at the time point t4, the automatic stop-start control unit 72 judges whether it has reached the time to automatically stop the engine 1 by referring to the measured value of the shortened delay timer (see S16). In addition, at the time point t4, the shortened timer T2 has already elapsed since the basic condition is satisfied, and thus the automatic stop-start control unit 72 automatically stops the engine 1 before the basic time T1 elapses.

Figure 10:
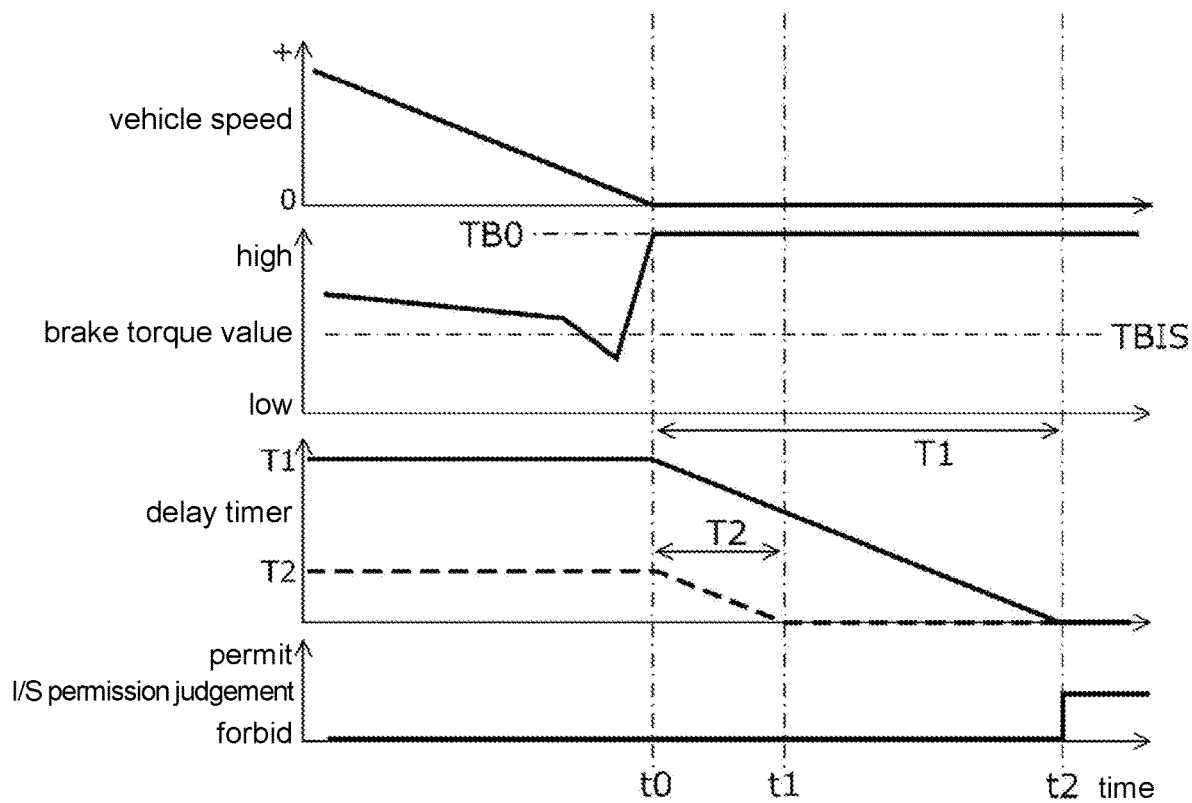
FIG. 10 is a time chart when the additional stepping of the brake pedal is completed before the vehicle is stopped.

FIG. 10 is a time chart when the additional stepping of the brake pedal 91 is completed before the vehicle V is stopped. The example of FIG. 10 shows a case where the driver decelerates by stepping on the brake pedal 91 and the vehicle V is stopped at the time point t0. The automatic stop-start control unit 72 starts the basic delay timer and the shortened delay timer in response to the situation that the vehicle speed becomes 0 at the time point t0 and the basic condition is satisfied (see S4), sets the reference value TB0 to the brake torque value TB at that time (see S6), and further sets the automatic stop permission torque value TBIS based on the gradient angle θ (see S8).

In the example of FIG. 10, the driver completes the additional stepping of the brake pedal 91 before the vehicle V is stopped at the time point t0. Therefore, the automatic stop-start control unit 72 judges whether the brake pedal 91 is additionally stepped on using the brake torque value TB at the time point t0 as the reference value TB0. In the example of FIG. 10, after the time point t0, the brake pedal 91 is stepped on with a force having the same magnitude as the force at the time point t0, and thus the brake torque value TB is constant. Therefore, in the example of FIG. 10, the brake pedal 91 is always stepped on with a strong force and the automatic stop-start control unit 72 judges whether it has reached the time to automatically stop the engine 1 referring to the basic delay timer. Accordingly, the automatic stop-start control unit 72 automatically stops the engine 1 in response to the situation that the basic time T1 has elapsed at the time point t2 since the basic condition is satisfied for the first time at the time point t0.

The vehicle V as described above has the following effects.

(1) The ECU 7 and the hydraulic pressure sensor 98 acquire the brake torque value TB which increases in accordance with the stepping-in amount of the brake pedal 91, and the automatic stop-start control unit 72 automatically stops the engine 1 after the basic time T1 has elapsed since the basic condition is satisfied and then automatically restarts the engine 1. In addition, the automatic stop-start control unit 72 automatically stops the engine 1 before the basic time T1 elapses when the brake torque value TB has increased since the basic condition is satisfied. Here, more specifically, the case where the brake torque value TB has increased since the basic condition is satisfied corresponds to, for example, a case where an operation of additionally stepping on the brake pedal 91 is performed by the driver after the basic condition is satisfied, and thus it is estimated that the driver has an intention to stop the vehicle V for a while. Thus, according to the vehicle V, when it is estimated that the driver has an intention to stop the vehicle for a while after the basic condition is satisfied, the engine 1 is automatically stopped without waiting for the elapse of the basic time T1, and thereby the fuel consumption can be improved without the driver feeling uncomfortable.

(2) The automatic stop-start control unit 72 automatically stops the engine 1 before the basic time T1 elapses, when the brake torque increment dTB of the brake torque value TB from the reference value TB0 after the basic condition is satisfied is equal to or greater than the additional stepping judgment value dTBth. Here, more specifically, the case where the brake torque increment dTB of the brake torque value TB from the reference value TB0 is equal to or greater than the predetermined additional stepping judgment value dTBth corresponds to, for example, a case where the brake pedal 91 is additionally stepped on by the driver more strongly than a force characterized by the additional stepping judgment value dTBth, and thus it is strongly estimated that the driver has an intention to stop the vehicle for a while. Thus, according to the vehicle V, the engine 1 can be automatically stopped taking the intention of the driver into account, and thus the fuel consumption can be improved without the driver feeling uncomfortable.

(3) In the automatic stop-start control unit 72, the reference value TB0 serving as a reference when judging whether the brake pedal 91 is additionally stepped on by the driver is set to the minimum value of the brake torque value TB after the basic condition is satisfied. Thereby, after the basic condition is satisfied, even if the brake pedal 91 is pumped by the driver, whether the brake pedal 91 is additionally stepped on by the driver can be appropriately judged, and thus the fuel consumption can be improved without the driver feeling uncomfortable.

(4) In the vehicle V, the engine 1 is automatically stopped before the basic time T1 elapses, when the brake torque increment dTB of the brake torque value TB from the reference value TB0 after the basic condition is satisfied is equal to or greater than the additional stepping judgment value dTBth and the shortened time T2 shorter than the basic time T1 has elapsed since the basic condition is satisfied. In other words, in the vehicle V, even if the brake pedal 91 is additionally stepped on by the driver immediately after the basic condition is satisfied, the automatic stop of the engine 1 is waited until the shortened time T2 elapses since the basic condition is satisfied. Thereby, a time for performing a process in order to automatically stop the internal combustion engine can be secured.

(5) In the disclosure, the basic condition includes that the vehicle is stopped. That is, in the disclosure, the driver can advance or delay timing of automatically stopping the internal combustion engine by a series of operations of the brake pedal when stopping the vehicle, and thus operability is good.

Other Configurations

A vehicle (for example, a vehicle V described later) according to the disclosure includes: an operation parameter acquisition part (for example, a hydraulic pressure sensor 98 and an ECU 7 described later) for acquiring an operation parameter value (for example, a brake torque value described later) which increases in accordance with an operation amount of a brake (for example, a braking system 9 described later); and an automatic stop-start control device (for example, the ECU 7 described later) which automatically stops an internal combustion engine (for example, an engine 1 described later) after a basic time (for example, a basic time T1 described later) has elapsed since a basic condition is satisfied, and then automatically restarts the internal combustion engine, wherein the automatic stop-start control device automatically stops the internal combustion engine before the basic time elapses when the operation parameter value has increased since the basic condition is satisfied.

In one embodiment, the automatic stop-start control device may automatically stop the internal combustion engine before the basic time elapses, when an increment (for example, a brake torque increment dTB described later) from a predetermined reference value (for example, a reference value TB0 described later) of the operation parameter value after the basic condition is satisfied is equal to or greater than a predetermined threshold value (for example, an additional stepping judgment value dTBth described later).

In one embodiment, the reference value may be a minimum value of the operation parameter value after the basic condition is satisfied.

In one embodiment, the automatic stop-start control device may automatically stop the internal combustion engine before the basic time elapses, when an increment from the reference value of the operation parameter value after the basic condition is satisfied is equal to or greater than the threshold value and a shortened time (for example, a shortened time T2 described later) shorter than the basic time has elapsed since the basic condition is satisfied.

In one embodiment, the basic condition may include that the vehicle is stopped.

In the disclosure, the operation parameter acquisition part acquires the operation parameter value which increases in accordance with the operation amount of the brake, and the automatic stop-start control device automatically stops the internal combustion engine after the predetermined basic time has elapsed since the predetermined basic condition is satisfied and then automatically restarts the internal combustion engine. In addition, the automatic stop-start control device automatically stops the internal combustion engine before the basic time elapses when the operation parameter value has increased since the basic condition is satisfied. Here, more specifically, the case where the operation parameter value has increased since the basic condition is satisfied corresponds to, for example, a case where an operation of additionally stepping on a brake pedal is performed by the driver after the basic condition is satisfied, and thus it is estimated that the driver has an intention to stop the vehicle for a while. Thus, according to the disclosure, when it is estimated that the driver has an intention to stop the vehicle for a while after the basic condition is satisfied, the internal combustion engine is automatically stopped without waiting for the elapse of the basic time, and thereby the fuel consumption can be improved without the driver feeling uncomfortable.

In the disclosure, the automatic stop-start control device automatically stops the internal combustion engine before the basic time elapses, when the increment of the operation parameter value from the predetermined reference value after the basic condition is satisfied is equal to or greater than a predetermined threshold value. Here, more specifically, the case where the increment of the operation parameter value from the reference value is equal to or greater than a predetermined threshold value corresponds to, for example, a case where the brake pedal is additionally stepped on by the driver more strongly than a force characterized by the threshold value, and thus it is strongly estimated that the driver has an intention to stop the vehicle for a while. Thus, according to the disclosure, the internal combustion engine can be automatically stopped taking the intention of the driver into account, and thus the fuel consumption can be improved without the driver feeling uncomfortable.

In the disclosure, in the automatic stop-start control device, the reference value serving as a reference when judging whether the brake pedal is additionally stepped on by the driver is set to the minimum value of the operation parameter value after the basic condition is satisfied. Thereby, after the basic condition is satisfied, even if the brake pedal is pumped by the driver, whether the brake pedal is additionally stepped on by the driver can be appropriately judged, and thus the fuel consumption can be improved without the driver feeling uncomfortable.

In the disclosure, the internal combustion engine is automatically stopped before the basic time elapses, when the increment of the operation parameter value from the reference value after the basic condition is satisfied is equal to or greater than the threshold value and the shortened time shorter than the basic time has elapsed since the basic condition is satisfied. In other words, in the disclosure, even if the brake pedal is additionally stepped on by the driver immediately after the basic condition is satisfied, the automatic stop of the internal combustion engine is waited until the shortened time elapses since the basic condition is satisfied. Thereby, a time for performing a process in order to automatically stop the internal combustion engine can be secured.

In the disclosure, the basic condition includes that the vehicle is stopped. That is, in the disclosure, the driver can advance or delay timing of automatically stopping the internal combustion engine by a series of operations of the brake pedal when stopping the vehicle, and thus operability is good.

One embodiment of the disclosure is described above, but the disclosure is not limited thereto. Within the scope of the gist of the disclosure, configuration of details may be appropriately changed.

What is claimed is:

1. A vehicle, comprising:
    an operation parameter acquisition part for acquiring an operation parameter value which increases in accordance with an operation amount of a brake; and
    an automatic stop-start control device which automatically stops an internal combustion engine after a basic time has elapsed since a basic condition is satisfied, and then automatically restarts the internal combustion engine, wherein
    the automatic stop-start control device automatically stops the internal combustion engine after a shortened time has elapsed and before the basic time elapses when the operation parameter value has increased since the basic condition is satisfied, wherein
    the basic condition comprises when the operation parameter value decreases and the vehicle is stopped or when an accelerator pedal of the vehicle is not stepped on,
    the shortened time is shorter than the basic time.

2. The vehicle according to claim 1, wherein after the basic condition is satisfied, a reference value is updated to be a minimum value of the operation parameter value after the basic condition is satisfied in a case when the operation parameter value is smaller than the operation parameter value when the basic condition is satisfied.

3. The vehicle according to claim 1, wherein the automatic stop-start control device automatically stops the internal combustion engine before the basic time elapses, when an increment of the operation parameter value from a reference value after the basic condition is satisfied is equal to or greater than a threshold value and the shortened time has elapsed since the basic condition is satisfied.

4. The vehicle according to claim 1, wherein after the basic condition satisfied, the automatic stop-start control device sets the operation parameter value as a reference value and automatically stops the internal combustion engine in a case when an increment of the operation parameter value from the reference value is equal to or greater than a threshold value, the operation parameter value is equal to or greater than an automatic stop permission value that permits an automatic stop of the internal combustion engine, and the shortened time has elapsed since the basic condition is satisfied.

5. The vehicle according to claim 2, wherein after the basic condition is satisfied, the automatic stop-start control device sets the operation parameter value as the reference value and automatically stops the internal combustion engine in a case when an increment of the operation parameter value from the reference value is equal to or greater than a threshold value, the operation parameter value is equal to or greater than an automatic stop permission value that permits an automatic stop of the internal combustion engine, and the shortened time has elapsed since the basic condition is satisfied.

* * * * *